United States Patent [19]

Hill

[11] Patent Number: 5,645,448
[45] Date of Patent: Jul. 8, 1997

[54] BATTERY CONNECTING MODULE WITH FUSE MOUNTING

[75] Inventor: Mark George Hill, Novi, Mich.

[73] Assignee: Yazaki Corporation, Tokyo, Japan

[21] Appl. No.: 541,194

[22] Filed: Oct. 16, 1995

[51] Int. Cl.⁶ .................................................. H01R 13/52
[52] U.S. Cl. .......................... 439/522; 439/621; 439/763
[58] Field of Search ................................. 439/521, 522, 439/620, 621, 762, 763, 764

[56] References Cited

U.S. PATENT DOCUMENTS

| | | | |
|---|---|---|---|
| 2,222,577 | 11/1940 | Thompson | 173/259 |
| 3,568,138 | 3/1971 | Bakker . | |
| 4,354,726 | 10/1982 | Kato et al. . | |
| 4,698,459 | 10/1987 | Drake | 439/522 X |
| 5,087,214 | 2/1992 | Dewar | 439/762 |
| 5,169,338 | 12/1992 | Dewar et al. | 439/522 |
| 5,171,169 | 12/1992 | Butcher et al. | 439/763 X |
| 5,316,505 | 5/1994 | Kipp | 439/762 |
| 5,346,407 | 9/1994 | Hood | 439/522 |
| 5,413,500 | 5/1995 | Tanaka | 439/521 |
| 5,439,759 | 8/1995 | Lippert et al. | 429/65 |

*Primary Examiner*—Khiem Nguyen
*Attorney, Agent, or Firm*—Young & Basile, PC

[57] ABSTRACT

A battery connecting module mountable to an automotive vehicle battery provides electrical connection between a battery post, a cable leading to an alternator, one or more cables leading to vehicle electrical systems such as a fuse box and a starter motor, and a main fuse located inside the module and connecting the alternator cable with the other components. The battery connecting module protects the major engine compartment electrical connections from solid and liquid contaminants, and locates the main fuse in a manner which protects the alternator cable from short circuit conditions. Two of the cables are connected to the module by cable terminals which extend downward and into close proximity with the vertical battery side walls, thereby adding to the security of the battery connecting module's mounting on the battery.

5 Claims, 2 Drawing Sheets

BATTERY CONNECTING MODULE WITH FUSE MOUNTING

FIELD OF THE INVENTION

The present invention relates to electrical power distribution apparatus for use on automotive vehicles, and particularly to a battery connecting module adapted for mounting directly to a battery and containing a high-current fuse for circuit protection.

BACKGROUND OF THE INVENTION

Automotive vehicle electrical systems typically comprise the combination of an engine-driven alternator and a lead-acid storage battery interconnected such that the alternator charges the battery as necessary. Both the battery and alternator are connected to circuits powering the various electrical components of the vehicle. Most of these circuits are provided with fuses for protection from over-current conditions. Most of the fuses are typically contained in a fuse box located either in the vehicle engine compartment or in a position accessible from inside the vehicle passenger compartment.

In general, it is desirable to locate the alternator, battery, and fuse box close to one another so that the electrical cables required to connect these components are kept to minimum length. If the fuse box is located in the passenger compartment or if, due to space constraints in the engine compartment, it is not practical to locate the fuse box close to the battery and/or alternator, a relatively long electrical cable will be required to run from the battery and/or alternator to the fuse box. Unless a fuse is provided in the vicinity of the battery and/or alternator, this cable will not be protected against short circuit conditions such as would occur if an un-fused alternator cable were to make contact with an electrical ground. Accordingly, it would in such a case be desirable to position a fuse close to the alternator/battery combination so that as much of the engine compartment wiring as possible is protected from electrical shorting.

The prior art discloses fuse boxes that mount directly to the battery and further provide a fuse to protect the cable between the battery and another remote fuse box which contains the individual circuit fuses. These prior art fuse boxes, however, are positioned beside the battery. In some automotive applications, particularly in small vehicles, space in the vehicle engine compartment is at a great premium and there may not be sufficient room for such a side battery mounting. Further, even if the battery installation does permit room for a single, side-mounted fuse, the location of the battery within the engine compartment may force the main cable fuse to be positioned such that is difficult to reach if it is necessary to replace or check the condition of the fuse.

SUMMARY OF THE INVENTION

The present invention provides a modular, main cable fuse housing for automotive batteries which are connected by cables to an alternator and a remote fuse box for individual circuit fuses, wherein the modular housing is mounted on top of the vehicle battery for maximum convenience, accessibility and under-hood space utilization.

According to a feature of the invention, the module includes a housing which contains a battery post-receiving terminal and fuse mounting means. The battery post-receiving terminal is positioned adjacent a hole in the bottom of the housing so that the battery post may extend into the housing and into electrical contact with the battery terminal. The battery terminal also connects with automatic power cables and with one end of a main fuse which is further connected to the alternator cable. This configuration places the major engine compartment electrical connections in a single location, protected from solid and liquid contaminants by the housing, and locates the main cable fuse in a manner which protects the alternator cable and other electrical components from short circuit conditions.

According to a further feature of the invention, the housing surrounds and encloses the battery post when the module is mounted to the battery, thus protecting the battery post from contaminants and corrosion.

According to another feature of the invention, two of the cables are connected to the module by cable terminals which are formed to extend out of the plane of the battery surface on which the module is mounted, so as to be in close proximity to other battery surfaces. The cable terminals add to the security of the battery connecting module's mounting on the battery since, if the module is twisted slightly about the battery post, the cable terminals contact the battery and so restrain the module against further twisting motion.

According to still another feature of the invention, the battery connecting module is adapted to mount to the upper horizontal surface of the battery over an upwardly projecting battery post. The module has a flat, low-profile shape so that when mounted to the battery it does not extend substantially above the top of the battery post. Mounting of the battery connecting module on top of the battery permits the module to be used in a crowded engine compartment where space constraints do not permit mounting alongside the battery. Also, access to the module is unlikely to be obstructed, so that the module can be easily installed, removed, or opened for servicing.

DETAILED DESCRIPTION OF THE PREFERRED EMBODIMENT

Figure 1:
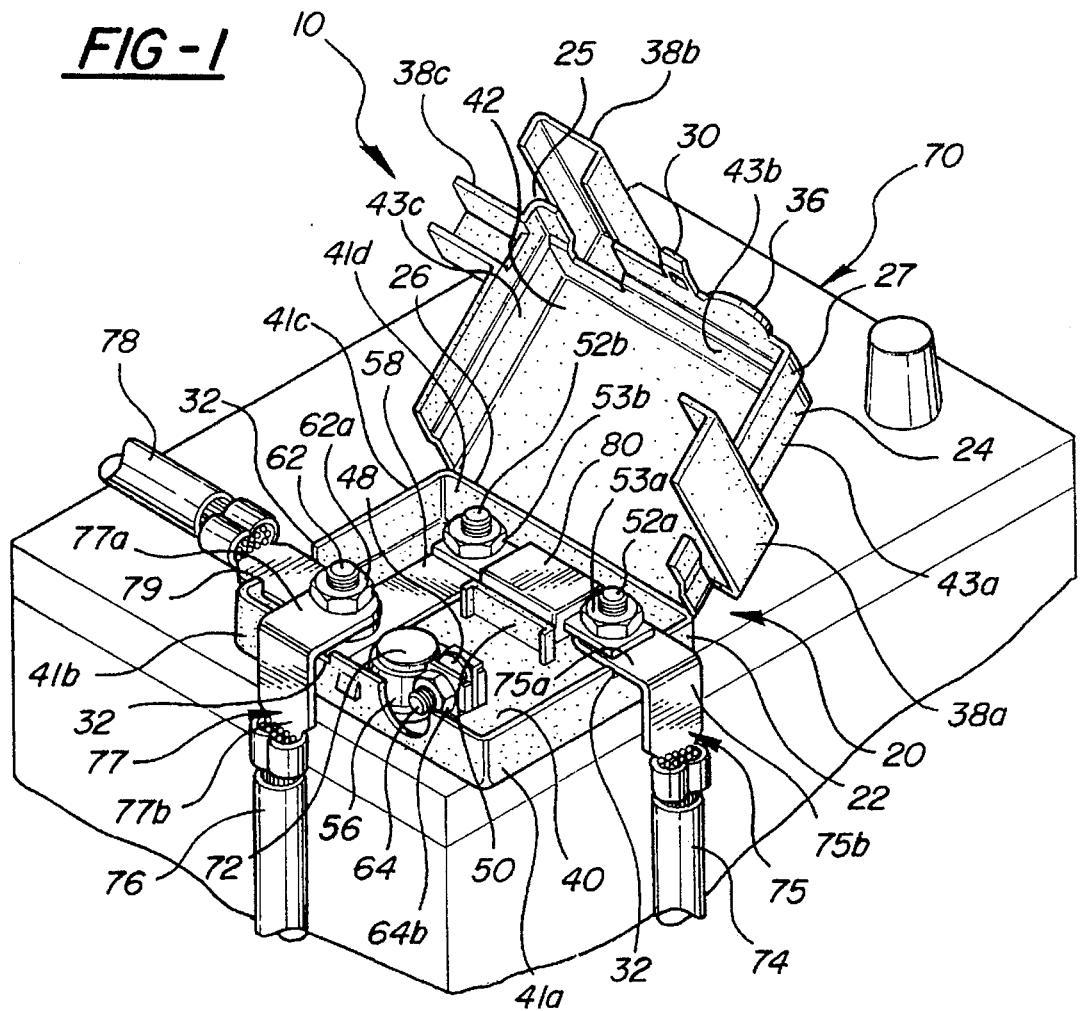
FIG. 1 is a perspective view of a battery connecting module constructed according to the invention and mounted to the top surface of a battery.
Figure 3:
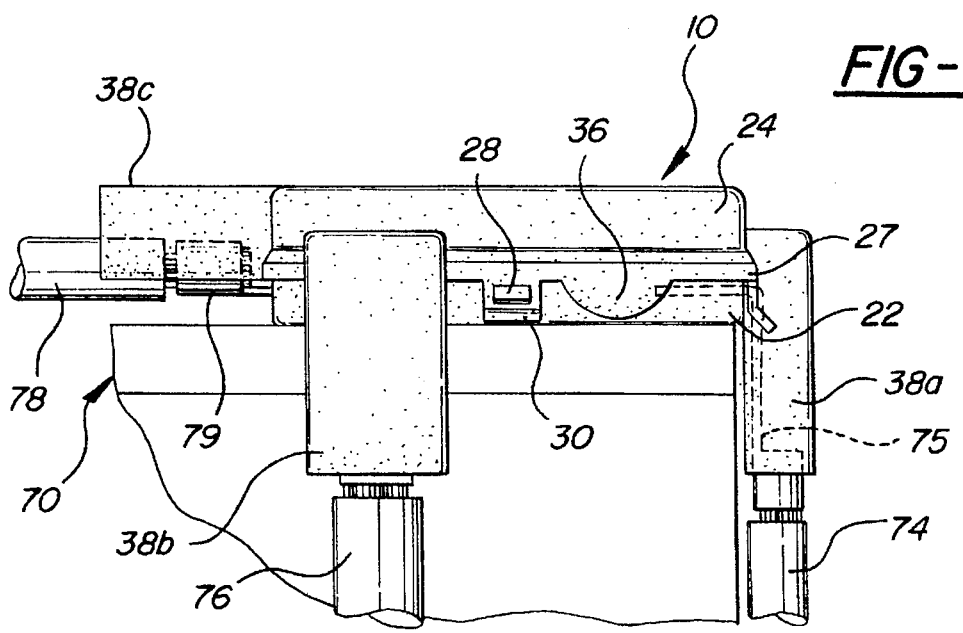
FIG. 3 is a side view of the battery connecting module of FIGS. 1 and 2 with the cover in the closed position.

As seen in FIG. 1, a battery connecting module 10 according to the present invention is adapted for mounting to a battery post 72 extending from the top surface of a battery 70 and provides for electrical interconnection between the battery, an alternator cable 74 connected to a motor-driven alternator (not shown), a starter cable 76 connected to a starter motor (not shown), and a fuse box cable 78 connected to a fuse box (not shown). Module 10 also provides means for mounting a conventional, commercially available, high-current main fuse 80 in electrical connection between alternator cable 74 and the distributed electrical systems of the vehicle.

A low-profile plastic housing 20 encloses the electrical components of battery connecting module 10 and comprises a base 22 and a cover 24, both preferably formed of an impact resistant thermoplastic resin. Base 22 has a substantially flat lower surface 40 surrounded by upwardly extending side walls 41a through 41d. Cover 24 has a substantially flat upper surface 42 surrounded by downwardly extending side walls 43a through 43d. Base 22 and cover 24 are preferably injection molded as a single unit and connected along their sides 41d, 43d respectively by a living hinge 26.

An outwardly flared skirt 25 is formed around the lower edges of the non-hinged cover side walls 43a, 43b, 43c, and a locking tab 30 and a semicircular tab 36 extend downwardly from the skirt of side wall 43b. Terminal hoods 38a, 38b, 38c extend outwardly from cover sides walls 43a, 43b, 43c respectively, with hood 38c being substantially in the plane of cover 24 while hoods 38a and 38b project out of the cover plane and beyond the edge of skirt 25.

Figure 2:
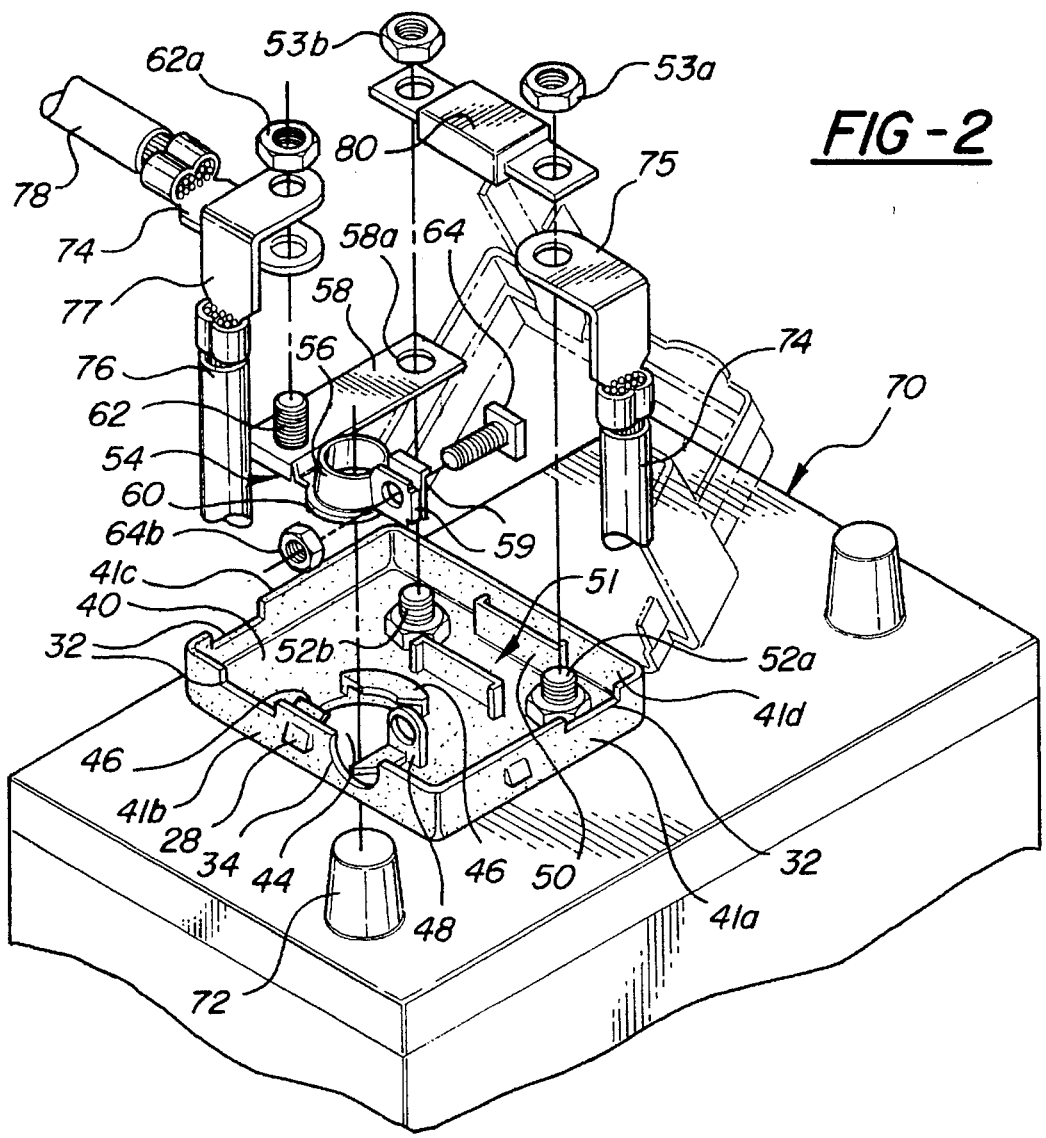
FIG. 2 is a perspective exploded view of the battery connecting module of FIG. 1 with cover portion of the housing removed for clarity.

As best seen in FIG. 2, elongated terminal cutouts 32 are formed in the upper edge of each of the three non-hinged base side walls 41a, 41b, 41c. A semicircular cutout 34 is formed in side wall 41b, and a locking projection 28 extends from side wall 41b adjacent the cutout.

Base lower surface 40 has a post hole 44 passing therethrough near side wall 41b, and a pair of terminal positioning ledges 46 and a retaining eye 48 are located immediately adjacent the hole at circumferentially spaced locations. A pair of fuse positioning walls 50 extend upwardly from lower surface 40, the walls being parallel with side wall 41d and defining therebetween a fuse mounting channel 51. Fuse mounting bolts 52a, 52b are molded into or otherwise secured to lower surface 40 to extend upwardly therefrom at either end of channel 51.

Still referring to FIG. 2, battery connecting module 10 includes a battery terminal 54 made of an electrically conductive material and comprising a post connecting ring 56 and a contiguous terminal connecting bar 58. Post connecting ring 56 is split vertically and clamping tabs 59 extend from the free ends of the split. The lower edge of ring 56 is flared radially outward to form a flange 60.

Terminal connecting bar 58 is joined with post connecting ring 56 at a point on the ring opposite clamping tabs 59, and a bolt 62 extends upwardly from the bar immediately adjacent the point of attachment. A hole 58a passes through the end of bar 58 distal from bolt 62. Battery terminal 54 may be conveniently manufactured as a sheet metal stamping, with bolt 62 inserted from below through a hole in terminal connecting bar 58 and the edges of the bar adjacent the bolt bent downwardly and under to capture the head of the bolt.

Alternator cable 74, starter cable 76, and fuse box cable 78 end in cable terminals 75, 77, and 79 respectively. For reasons to be discussed below, alternator cable terminal 75 and starter cable terminal 77 are formed with right-angled bends dividing them into horizontal portions 75a, 77a respectively and vertical portions 75b, 77b respectively.

Battery terminal 54 is installed inside of housing 20 by placing the battery terminal on base lower surface 40 so that retaining eye 48 projects upward into post connecting ring 56 and terminal connecting bar 58 extends toward fuse mounting bolt 52b, and then moving the battery terminal toward sidewall 41c so that flange 60 on the bottom of ring 56 slides underneath positioning ledges 46 and clamping tabs 59 are on either side of retaining eye 48. There is sufficient clearance between ledges 46 and ring 56 so that as this movement is accomplished terminal connecting bar 58 may be manipulated to place hole 58a over fuse mounting bolt 52b.

If battery connecting module 10 is be shipped of otherwise handled in this condition, a clamping bolt 64 is inserted through the holes in clamping tabs 59 and retaining eye 48, and a nut 64b is threaded onto the bolt to retain battery terminal 56 in position.

Battery connecting module 10 is mounted to battery 70 by opening housing cover 24 and placing the module on top of the battery so that battery post 72 projects upward through post hole 44 and into post connecting ring 56 and the lower surface of housing base 22 is substantially flush against the upper surface of the battery. Note that post hole 44 is located on base lower surface 40 so that when battery post 72 is inserted in the hole, housing side walls 41a and 41b are in close proximity to the two battery side walls 71a, 71b closest to post 72. Nut 64a is then tightened onto clamping bolt 64 to secure battery terminal 54 onto battery post 72, with semicircular cut-out 34 providing access to nut 64a for a socket wrench (not shown) or other tightening tool.

Mounting battery connecting module 10 on top of battery 70 is advantageous both in that the module may be used in a crowded engine compartment where space constraints would not permit mounting alongside the battery, and in that access to the module is unlikely to be obstructed. Also, in this position the module substantially surrounds battery post 72 to protect it from contamination and corrosion.

Figure 4:
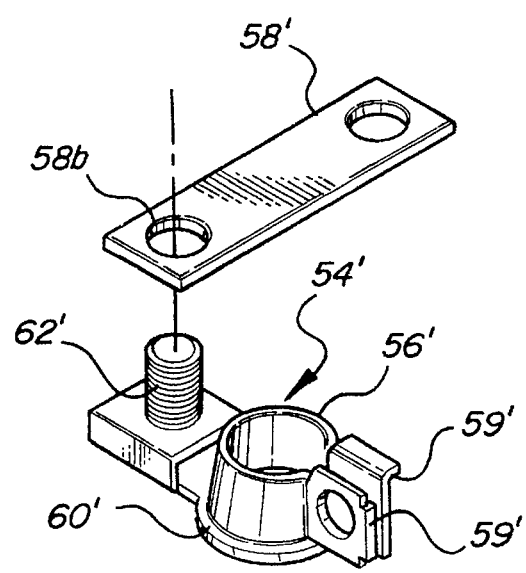
FIG. 4 is a perspective view of an alternative embodiment of a battery terminal according to the invention.

FIG. 4 shows an alternative embodiment of battery terminal 54' wherein a post connecting ring 56' and a terminal connecting bar 58' are two separately formed components. A hole 58b in terminal connection bar 58' allows it to be placed over bolt 62'.

As shown in FIG. 1, battery connecting module 10 is connected with the other components of the vehicle electrical system by: a) placing fuse box cable terminal 79 and starter cable terminal 77 over terminal connecting bar bolt 62 and tightening nut 62a onto the bolt, b) placing alternator cable terminal 75 over fuse mounting bolt 52a, c) placing main fuse 80 in fuse mounting channel 51 with its ends over fuse mounting bolts 52a, 52b, and d) tightening nuts 53a, 53b respectively onto the fuse mounting bolts.

When cable terminals 75, 77, 79 are connected with module 10, they extend outwardly from housing 20 through cutouts 32, and alternator and starter cable terminal vertical portions 75a, 77a lie in close proximity to their respective battery side walls 71a, 71b. This proximity contributes to the security of the mounting of battery connecting module 10 to battery 70, since any force tending to twist the battery connecting module about battery post 72 is resisted by contact between cable terminal vertical portions 75a, 77a and battery side walls 71a, 71b.

After battery connecting module 10 is properly mounted to battery 70, housing cover 24 is closed by pushing it downward until locking tab 30 snaps over locking projection 28. When cover 24 is closed, skirt 27 extends downwardly over the outside of the upper edge of base 22 and semicircular tab 36 is positioned over semicircular cut-out 34 to protect against the entry of solid or liquid contaminants into module 10. Closing cover 24 also places terminal hoods 38a–c in protective positions over and around their respective cable terminals 75, 77, 79. Cover 24 may be easily opened if necessary to inspect, remove, or service battery connecting module 10 by hooking a finger underneath locking tab 30 and pulling outwardly and upwardly to disengage it from locking projection 28.

The overall flat or low-profile shape of housing 20 when cover 24 is closed results in battery connecting module 10 extending only very slightly above the highest point of battery terminal 72 when the module is mounted on battery 70.

As is apparent from the foregoing description, the battery connecting module of the present invention provides a compact, efficiently packaged means for connecting a plurality of electrical cables to a battery terminal and for mounting a main fuse in a position to protect a substantial amount of engine compartment wiring. The battery top mounting of the module provides convenient access for servicing and occupies a minimum of usable space in the engine compartment.

Whereas a preferred embodiment of the invention has been illustrated and described in detail, it will be apparent that various changes may be made in the disclosed embodiment without departing from the scope or spirit of the invention.

I claim:

1. A battery mounted connecting module for establishing electrical connection between a battery post extending from a first exterior surface of an automotive battery, an alternator cable, a plurality of electrical circuits, and a main fuse, the battery connecting module comprising:

a housing having a surface with a hole formed therein;

a battery post-receiving terminal mounted inside of the housing adjacent the hole for establishing electrical connection with the battery post when the battery connecting module is mounted to the battery, the battery terminal having terminal connecting means for establishing electrical connection with the main fuse and with the plurality of electrical circuits;

fuse mounting means located inside of the housing adjacent the battery terminal such that the fuse is securable in electrical connection between the alternator cable and the terminal connecting means;

an alternator cable terminal connectable to the alternator cable and removably connectable to the fuse, connection of the alternator cable terminal to the fuse placing the alternator cable terminal in close proximity to a second exterior surface of the battery; and a second cable terminal connectable to at least one of the plurality of electrical circuits and removably connectable to the terminal connecting means, connection of the second cable terminal to the terminal connecting means placing the second cable terminal in close proximity to a third exterior surface of the battery.

2. A battery-mounted connecting module as described in claim 1 wherein the housing substantially surrounds the battery post when the battery connecting module is mounted to the battery.

3. A battery-mounted connecting module as described in claim 1 wherein the first exterior battery surface is an upper surface and the battery post extends upwardly therefrom, and the battery connecting module when mounted to the battery does not extend substantially above a highest point of the battery post.

4. A battery-mounted connecting module for establishing electrical connection between a battery post extending from a top exterior surface of a battery, an alternator cable, a plurality of electrical circuits, and a main fuse, the battery connecting module comprising:

a housing having a lower surface with a hole formed therein;

a battery post-receiving terminal mounted inside of the housing adjacent the hole and having a post connecting portion for establishing electrical connection with the battery post and a terminal connecting portion for establishing electrical connection with the main fuse and with the plurality of electrical circuits;

fuse mounting means located inside of the housing adjacent the battery terminal such that the fuse is securable in electrical connection between the alternator cable and the battery terminal;

an alternator cable terminal securable to the end of the alternator cable and removably connectable to the fuse; and a second cable terminal connectable to at least one of the plurality of electrical circuits and removably connectable to the terminal connecting portion;

the battery connecting module being mountable to the top exterior surface of the battery such that the battery post extends through the hole and into electrical contact with the post connecting portion of the battery terminal and the housing substantially surrounds the battery post; and the alternator cable terminal and the second cable terminal when connected to the battery connecting module extending downwardly therefrom to be in close proximity to first and second vertical exterior battery surfaces respectively.

5. A battery connecting module as described in claim 4 which when mounted to the battery does not extend substantially above a highest point of the battery post.

* * * * *